United States Patent Office 3,413,376
Patented Nov. 26, 1968

3,413,376
CATALYSTS AND METHOD FOR THE PREPARATION OF LIQUID OLEFIN POLYMERS
James W. Cleary, Bartlesville, Okla., assignor to Phillips Petroleum Company, a corporation of Delaware
No Drawing. Filed Sept. 14, 1964, Ser. No. 396,425
13 Claims. (Cl. 260—683.15)

ABSTRACT OF THE DISCLOSURE

Mono-olefins having from 2 to 4 carbon atoms are polymerized by contact with a catalyst which forms by mixing a transition metal subhalide, an alkyl aluminum compound, and certain organo mono-halides in an unsymmetrical polar solvent selected from methylene chloride, chloroform, 1,1-dichloroethane, and 1,1,2-trichloropropane.

This invention relates to catalysts and to the polymerization of olefins.

Low molecular weight olefins having 2 to 4 carbon atoms per molecule can be polymerized to liquid polymers which boil above 400° F. Such liquid polymers are generally described as oily polymers and find use as lubricants, generally motor lubricants, and the like, because they possess high viscosity and low pour points. Such polymers are also used as starting materials in the manufacture of detergents.

I have now discovered a new catalyst system which has particular utility for polymerizing monoolefins to liquid polymers. The use of this catalyst system provides an improved method for polymerizing low molecular weight olefins with improved productivity over those methods known and used before.

An object of this invention is to provide an improved catalyst system. It is another object of this invention to provide an improved method for obtaining liquid polymers from low molecular weight olefins. Still another object of this invention is to provide liquid polymers of monoolefins which possess properties suitable for use as lubricants.

Other aspects, objects and advantages of this invention will be apparent from further study of this disclosure and appended claims.

In accordance with this invention a new catalyst system is provided which forms on mixing a transition metal subhalide, an alkylaluminum compound and an organohalide.

Further in accordance with this invention monoolefins having 2 to 4 carbon atoms per molecule are polymerized to liquid polymers by contacting such olefins or mixtures thereof with this catalyst system under polymerization conditions.

I have found that marked improvement in the polymerization process and results thereof when using this catalyst system are not obtainable by any binary combination of the three ingredients I employ for polymerizing monoolefins to liquid polymers and are not obtainable by the catalyst systems known in the art.

The transition metal subhalide is defined by the formula $MX_a$ where M is a transition metal selected from the group consisting of metals in Groups IVB, VB, VIB and VIII of the Periodic Table, as published in Lange's Handbook of Chemistry, 8th edition, 1952, pages 56–57. Such metals include titanium, zirconium, hafnium, vanadium, niobium, tantalum, chromium, molybdenum, tungsten, iron, cobalt, nickel, ruthenium, rhodium, palladium, osmium, iridium, and platinum. The X in the formula is a halogen selected from the group consisting of chlorine, bromine and iodine. By subhalide is meant a halide wherein the metal is in a valence state other than its highest valence state, therefore $a$ is a number less than the highest valence of such metal. Examples of subhalide transition metals are titanium trichloride, vanadium trichloride, molybdenum tetrachloride, and the like.

The alkylaluminum compound component of the catalyst system has the general formula $R_yAlX_{3-y}$, where R is an alkyl group having 1 to 10 carbon atoms, X is chlorine, bromine, or iodine, and $y$ is a number from 1 to 3. Examples are methylaluminum dichloride, ethylaluminum dichloride, diethylaluminum chloride, ethylaluminum sesquichloride ($AlEt_2Cl \cdot AlEtCl_2$), ethylaluminum dibromide, di-n-octylaluminum iodide, decylaluminum diiodide, triethylaluminum, and the like.

The organohalide component of the catalyst system has the following general formula:

where $R_1$, $R_2$, and $R_3$ are not necessarily the same, and are selected from hydrogen and the following radicals: alkyl, alkenyl, alkynyl, cycloalkyl, cycloalkenyl, and aryl; X is chlorine, bromine, or iodine, and the compound contains from 2 to 24 carbon atoms. Examples of these halides are: triphenylmethyl chloride, tribenzylmethyl iodide, t-butyl chloride, allyl chloride, o-tolylmethyl bromide, benzyl bromide, 1,1-diethyl-1-bromopropane, 1-cyclohexyl-1-phenyl-1-chloropropane, 1,1-divinyl-1-iodopropane, 3-phenyl-3-chlorononyne-1,4-bromo-4-(2-cyclohexenyl)hexene-2, tricyclopentylmethyl chloride, 2-chloro-2-(1-naphthyl)-6-phenyloctane, 1-(3-ethylcyclopentyl)-1-phenyl-1-iodopentene-2, tetracosyl chloride, ethyl chloride, and the like.

Any combination of at least one each of the defined transition metal subhalides, alkylaluminum compounds, and organohalides may be used in this catalyst system for polymerizing low molecular weight monoolefins to liquid polymers. Also, individual mixtures of each of the various defined transition metal subhalides, the alkylaluminum compounds and the organohalides can be used in this catalyst system.

For the production of liquid polymers the feedstock is monoolefins having 2 to 4 carbon atoms per molecule. Such monoolefins include ethylene, propylene, 1-butene, 2-butene, and isobutylene. These monoolefins may be polymerized singularly to produce homopolymers or in any possible combinations to produce copolymers.

The polymerization reaction can be carried out batchwise or continuously. It will generally be conducted at a temperature in the range of 125 to 350° F., and preferably within the range of 150 to 250° F. The pressure employed for polymerization will generally be in the range of 100 to 1000 p.s.i.g., and preferably within the range of 250 to 750 p.s.i.g. The reaction can be conducted in the presence of a liquid diluent which is inert and non-deleterious to the reaction. The diluent is most generally a hydrocarbon, such as a paraffin or cycloparaffin, which has a boiling point below 400° F. The paraffins and cycloparaffins generally used will have 3 to 12, preferably 5 to 12, carbon atoms per molecule. Examples of suitable hydrocarbon diluents include propane, isobutane, normal pentane, isopentane, isooctane, methylcyclohexane, cyclohexane, decane, dodecane, and the like. Mixtures of these hydrocarbons can also be employed as the diluent.

During the polymerization, the presence of an unsymmetrical polar solvent is desirable to increase polymer yield. Preferred solvents are the unsymmetrical lower alkyl halides such as methylene chloride, chloroform, 1,1-dichloroethane, 1,1,2-trichloropropane, and the like. This polar material is used at a concentration level of 0.01 to 0.5 mols per millimol of transition metal subhalide.

For obtaining the best results of polymerization with this catalyst system, the mol ratio of the three components employed, transition metal subhalide to alkylaluminum compound to organohalide, is in the range of 1:0.5:0.9 to 1:5.0:3. The ratio of the transition metal subhalide to the monoolefin is in the range of 1 millimol:3 mols to 1 millimol:10 mols.

When the polymerization is completed, the catalyst can be deactivated and the liquid polymers can be separated from the polymerization mixture by suitable methods, such as by treatment with water or alcohol.

Advantages of this invention are illustrated by the following example which is presented to illustrate the invention but is not intended to be limiting to the specific monomers, catalysts and conditions employed.

EXAMPLE

In the following examples the olefin used was propylene, the transition metal subhalide used was titanium trichoride, the alkylaluminum compound used was either diethylaluminum chloride (DEAC), ethylaluminum sesquichloride (EASC), ethylaluminum dichloride (EADC) or triethylaluminum (TEA). Unless otherwise indicated, 1 millimol of organohalide and 1 millimol of titanium trichloride were dissolved in 2.5 milliliters of methylene chloride, and this mixture, together with 3 millimols of the alkylaluminum compound, 25 milliliters of additional methylene chloride, and 200 grams of propylene was charged to a stirred reactor. The reaction period was 4 hours at a temperature of 175° F. under autogenous pressure. At the end of the reaction period, excess propylene was vented, and the contents of the reactor were treated with n-pentane to dissolve liquid polymer. This solution was filtered through a column of attapulgus clay to remove catalyst residues, the n-pentane was flashed off the polymer, and it was weighed. The pentane-insoluble material was treated in one of two ways. If only a small amount (1–2 percent of total polymer) was present, it was treated with methanol for catalyst removal and weighed. If a larger amount was present, it was dissolved in xylene, separated from catalyst, precipitated with methanol, and weighed.

| Run No. | Organohalide | Alkyl-aluminum halide | Polymer yield, g. | Weight Percent liquid polymer |
|---|---|---|---|---|
| 1 | $(C_6H_5)_3CCl$ | TEA | 138 | 66 |
| 2 | $(C_6H_5)_3CCl$ | EADC | 27 | 99+ |
| 3 | $(C_6H_5)_3CCl$ | EASC | 173 | 99+ |
| 4 | $(C_6H_5)_3CCl$ | DEAC | 178 | 98 |
| 5 | $(C_6H_5)_3CCl$ | DEAC | 15.5 | 97 |
| 6 | $CH_2=CHCH_2Cl$ [1] | EASC | 61 | 99+ |
| 7 | $(CH_3)_3CCl$ | EASC | 42 | 98 |
| 8 | None [2] | DEAC | 2.3 | 26 |
| 9 | do [3] | DEAC | 9.4 | 21 |
| 10 | $(C_6H_5)_3CCl$ [3] | EASC | 4.4 | 78.8 |

[1] Organohalide and $TiCl_3$ were not premixed.
[2] Methylene chloride was present (25 ml.).
[3] Methylene chloride was absent.

The data for Run 1 show that use of triethylaluminum as a component in the catalyst results in a high polymer yield. The data for Runs 2, 3, and 4 show that use of an organoaluminum halide results in the production of almost entirely liquid polymer, with an increased yield being obtained as the proportion of halogen decreases. The data for Run 5 show that premixing of the organohalide and titanium trichloride is desirable; without such premixing the yield is lower, although the percentage of liquid polymer is still quite high. The data for Runs 6 and 7 show that various organohalides can be used. The data for Run 8 show that the methylene chloride present in all runs does not function as the organohalide of the catalyst system; both the yield and the percentage liquid polymer were low. The data for Run 9 show that the binary cmobination of titanium trichloride-diethylaluminum chloride gives neither the high yield nor the high percentage liquid polymer obtained with the ternary catalyst systems. The data for Run 10 show that the use of the mixture of the three components in the absence of the polar solvent greatly reduces the polymerization yield but gives a high percentage of liquid polymer.

To one skilled in the art, reasonable variations and modifications of this invention will be apparent which will not depart from the spirit and scope thereof.

That which is claimed is:

1. A method of polymerizing monoolefins having 2 to 4 carbon atoms per molecule comprising contacting said monoolefins with a catalyst system which forms on mixing in an unsymmetrical polar solvent selected from methylene chloride, chloroform, 1,1-dichloroethane, and 1,1,2-trichloropropane materials comprising (1) a transition metal subhalide of the general formula $MX_a$ where M is a transition metal selected from the group consisting of metals in Groups IVB, VB, VIB, and VIII of the Periodic Table, X is a halogen selected from the group consisting of chlorine, bromine and iodine, and $a$ is a number less than the highest valence of such metal; (2) an alkylaluminum compound of the general formula $R_yAlX_{3-y}$, where R is an alkyl group having 1 to 10 carbons atoms, X is selected from the group consisting of chlorine, bromine, and iodine, and $y$ is a number from 1 to 3; and (3) an organohalide having 2 to 24 carbon atoms and having the general formula

where $R_1$, $R_2$, and $R_3$ are not necessarily the same, and are selected from hydrogen and the following radicals: alkyl, alkenyl, alkynyl, cycloalkyl, cycloalkenyl, and aryl; X is selected from the group consisting of chlorine, bromine, and iodine.

2. A method of forming liquid polymers comprising contacting monoolefins having 2 to 4 carbon atoms per molecule with a catalyst system which forms on mixing in an unsymmetrical polar solvent selected from methylene chloride, chloroform, 1,1-dichloroethane, and 1,1,2-trichloropropane materials consisting essentially of (1) a transition metal subhalide of the general formula $MX_a$ where M is a transition metal selected from the group consisting of metals in Groups IVB, VB, VIB, and VIII of the Periodic Table, X is a halogen selected from the group consisting of chlorine, bromine and iodine, and $a$ is a number less than the highest valence of such metal; (2) an alkylaluminum compound of the general formula $R_yAlX_{3-y}$, where R is an alkyl group having 1 to 10 carbon atoms, X is selected from the group consisting of chlorine, bromine and iodine, and $y$ is a number from 1 to 3; and (3) an organohalide having 2 to 24 carbon atoms and having the general formula

where $R_1$, $R_2$, and $R_3$ are not necessarily the same, and are selected from hydrogen and the following radicals: alkyl, alkenyl, alkynyl, cycloalkyl, cycloalkenyl, and aryl; X is selected from the group consisting of chlorine, bromine, and iodine; the mol ratio of components (1), (2), and (3) being in the range of 1:0.5:0.9 to 1:5.0:3, the ratio of component (1) (millimols) to olefins feed (mols) being in the range of 1:3 to 1:10; the concentration level of said unsymmetrical polar solvent being 0.01 to 0.5 mol per millimole of said transition metal subhalide; and the polymerization is conducted at a temperature in the range of 125 to 350° F., and a pressure in the range of 100 to 1000 p.s.i.g.

3. The method of claim 2 wherein said unsymmetrical polar solvent is methylenechloride.

4. The method of claim 3 wherein said monoolefin is propylene and wherein said catalyst system forms on mixing (1) titanium trichloride, (2) ethyl-aluminum dichloride and (3) triphenylmethyl chloride in methylene chloride, said temperature is in the range of 150 to 250° F., and said pressure is in the range of 250 to 750 p.s.i.g.

5. The method of claim 3 wherein said monoolefin is propylene and wherein said catalyst system forms on mixing (1) titanium trichloride, (2) diethyl aluminum chloride and (3) triphenylmethyl chloride in methylene chloride, said temperature is in the range of 150 to 250° F., and said pressure is in the range of 250 to 750 p.s.i.g.

6. The method of claim 4 further comprising conducting the polymerization in the presence of n-pentane.

7. A catalyst composition which forms on mixing in an unsymmetrical polar solvent selected from methylene chloride, chloroform, 1,1-dichloroethane, and 1,1,2-trichloropropane materials comprising (1) a transition metal subhalide of the general formula $MX_a$ where M is a transition metal selected from the group consisting of metals in Groups IVB, VB, VIB, and VIII of the Periodic Table, X is a halogen selected from the group consisting of chlorine, bromine and iodine, and $a$ is a number less than the highest valence of such metal; (2) an alkylaluminum compound of the general formula $R_yAlX_{3-y}$, where R is an alkyl group having 1 to 10 carbon atoms, X is selected from the group consisting of chlorine, bromine and iodine, and $y$ is a number from 1 to 3; and (3) an organohalide having 2 to 24 atoms and having the general formula

where $R_1$, $R_2$, and $R_3$ are not necessarily the same, and are selected from hydrogen and the following radicals: alkyl, alkenyl, alkynyl, cycloalkyl, cycloalkenyl, and aryl; and X is selected from the group consisting of chlorine, bromine and iodine.

8. A catalyst composition which forms on mixing in an unsymmetrical polar solvent selected from methylene chloride, chloroform, 1,1-dichloroethane, and 1,1,2-trichloropropane material comprising (1) a transition metal subhalide of the general formula $MX_a$ where M is a transition metal selected from the group consisting of metals in Groups IVB, VB, VIB, and VIII of the Periodic Table, X is a halogen selected from the group consisting of chlorine, bromine and iodine, and $a$ is a number less than the highest valence of such metal; (2) an alkylaluminum compound of the general formula $R_yAlX_{3-y}$, where R is an alkyl group having 1 to 10 carbon atoms, X is selected from the group consisting of chlorine, bromine and iodine, and $y$ is a number from 1 to 3; and (3) an organohalide having 2 to 24 carbon atoms and having the general formula

where $R_1$, $R_2$, and $R_3$ are not necessarily the same, and are selected from hydrogen and the following radicals: alkyl, alkenyl, alkynyl, cycloalkyl, cycloalkenyl, and aryl; and X is selected from the group consisting of chlorine, bromine and iodine; the mol ratio of components (1), (2) and (3) being in the range of 1:0.5:0.9 to 1:5.0:3 and the concentration level of said unsymmetrical polar solvent being 0.01 to 0.5 mol per millimole of said transition metal subhalide.

9. The catalyst composition of claim 8 which forms on mixing in methylene chloride material comprising (1) titanium trichloride, (2) diethylaluminum chloride and (3) triphenylmethyl chloride.

10. A method of preparing a catalyst system which comprises dissolving in an unsymmetrical polar solvent selected from methylene chloride, chloroform, 1,1-dichloroethane, and 1,1,2-trichloropropane, the materials (1) a transition metal subhalide of the general formula $MX_a$ where M is a transition metal selected from the group consisting of metals in Groups IVB, VB, VIB, and VIII of the Periodic Table, X is a halogen selected from the group consisting of chlorine, bromine and iodine, and $a$ is a number less than the highest valence of such metal, (2) an organohalide having 2 to 24 carbon atoms and having the general formula

where $R_1$, $R_2$, and $R_3$ are not necessarily the same, and are selected from hydrogen and the following radicals: alkyl, alkenyl, alkynyl, cycloalkyl, cycloalkenyl, and aryl; and X is selected from the group consisting of chlorine, bromine and iodine to form a preliminary admixture and thereafter adding to said preliminary mixture; (3) an alkylaluminum compound of the general formula $R_yAlX_{3-y}$, where R is an alkyl group having 1 to 10 carbon atoms, X is selected from the group consisting of chlorine, bromine and iodine, and $y$ is a number from 1 to 3.

11. The method of claim 10 wherein the mol ratio of said components (1), (3), and (2) is in the range of 1:0.5:0.9 to 1:5.0:3 and the concentration level of said unsymmetrical polar solvent being 0.01 to 0.5 mol per millimole of said transition metal subhalide.

12. The method of claim 11 wherein more of said unsymmetrical polar solvent is added to said preliminary mixture with said alkyl aluminum compound.

13. The method of claim 11 wherein said unsymmetrical polar solvent comprises methylene chloride.

References Cited

UNITED STATES PATENTS

| | | |
|---|---|---|
| 2,907,805 | 10/1959 | Bestian et al. |
| 2,993,942 | 7/1961 | White et al. |
| 3,131,171 | 4/1964 | Calfee. |
| 3,168,588 | 2/1965 | White et al. |

PAUL M. COUGHLAN, Jr., *Primary Examiner.*